United States Patent
Jochim et al.

(10) Patent No.: US 6,650,898 B2
(45) Date of Patent: Nov. 18, 2003

(54) SIGNAL TRANSLATING REPEATER FOR ENABLING A TERRESTRIAL MOBILE SUBSCRIBER STATION TO BE OPERABLE IN A NON-TERRESTRIAL ENVIRONMENT

(75) Inventors: Kenneth J. Jochim, Boulder, CO (US); Jerry H. Polson, Longmont, CO (US)

(73) Assignee: Aircell, Inc., Louisville, CO (US)

( * ) Notice: Subject to any disclaimer, the term of this patent is extended or adjusted under 35 U.S.C. 154(b) by 0 days.

(21) Appl. No.: 10/152,870

(22) Filed: May 20, 2002

(65) Prior Publication Data

US 2002/0197990 A1 Dec. 26, 2002

Related U.S. Application Data

(63) Continuation-in-part of application No. 09/686,923, filed on Oct. 11, 2000, which is a continuation-in-part of application No. 09/379,825, filed on Aug. 24, 1999, now Pat. No. 6,408,180, which is a continuation-in-part of application No. 08/027,333, filed on Mar. 8, 1995, now Pat. No. 5,444,762, and a continuation-in-part of application No. 07/847,920, filed on Mar. 6, 1992, now Pat. No. 5,557,656.

(51) Int. Cl.⁷ .................................................. H04Q 7/20
(52) U.S. Cl. ...................... 455/431; 455/552; 455/67.11
(58) Field of Search ............................... 455/431, 552, 455/67.11–67.16, 232.1, 552.1, 553.1, 13.1, 12.1, 11.1, 19

(56) References Cited

U.S. PATENT DOCUMENTS

| | | | | |
|---|---|---|---|---|
| 3,781,684 A | * | 12/1973 | Inslerman | 455/11.1 |
| 3,859,475 A | * | 1/1975 | Wulfsberg et al. | 455/431 |
| 4,017,799 A | * | 4/1977 | Burdett et al. | 455/431 |
| 4,019,181 A | * | 4/1977 | Olsson et al. | 455/19 |
| 4,358,763 A | * | 11/1982 | Strauch | 455/19 |
| 4,419,766 A | * | 12/1983 | Goeken et al. | 455/431 |
| 4,970,510 A | * | 11/1990 | Stelling | 455/67.1 |
| 5,067,172 A | * | 11/1991 | Schloemer | 455/431 |
| 5,123,112 A | * | 6/1992 | Choate | 455/431 |
| 5,276,908 A | * | 1/1994 | Koohgoli et al. | 455/454 |
| 5,367,304 A | * | 11/1994 | Jan et al. | 455/13.1 |
| 5,428,815 A | * | 6/1995 | Grube | 455/431 |
| 5,455,964 A | * | 10/1995 | Roos et al. | 455/522 |
| 5,519,761 A | | 5/1996 | Gilhousen | |
| 5,535,430 A | * | 7/1996 | Aoki et al. | 455/552 |

(List continued on next page.)

FOREIGN PATENT DOCUMENTS

| | | | | |
|---|---|---|---|---|
| GB | 2227393 A | * | 7/1990 | H04Q/7/04 |
| WO | WO 8910626 A1 | * | 11/1989 | H01J/9/38 |
| WO | WO 9428684 A1 | * | 12/1994 | H04Q/7/00 |
| WO | WO 9821838 A1 | * | 5/1998 | H04B/7/185 |
| WO | WO 9826521 A1 | * | 6/1998 | H04B/7/185 |
| WO | WO 00/76087 A1 | | 12/2000 | |

OTHER PUBLICATIONS

Casewell, I.E. The provision of GSM cellular radio environments within passenger aircraft operating over Europe, Dec. 1–14, 1989, pp. 172–176.*

Primary Examiner—Quochien Vuong
Assistant Examiner—Lana Le
(74) Attorney, Agent, or Firm—Patton Boggs LLP

(57) ABSTRACT

The present signal translating repeater is located in an aircraft and provides service to mobile subscriber stations that are located in the aircraft, using the ground-based cellular communication paradigm. The present signal translating repeater converts these ground-based cellular communication signals into signals pursuant to the non-terrestrial cellular telecommunication format and transmits these signals to the non-terrestrial cell site(s) presently serving the aircraft. In this manner, the subscribers in the aircraft can use their existing ground-based mobile subscriber stations in a manner that is consistent with use in communicating with the ground-based cell sites, while the aircraft communicates with the non-terrestrial cell site(s) presently serving the aircraft in a manner that is consistent with non-terrestrial mobile subscriber stations.

22 Claims, 4 Drawing Sheets

U.S. PATENT DOCUMENTS

| | | | |
|---|---|---|---|
| 5,557,656 A | * | 9/1996 | Ray et al. .................... 455/431 |
| 5,559,865 A | | 9/1996 | Gilhousen |
| 5,613,197 A | * | 3/1997 | Copeland et al. .......... 455/11.1 |
| 5,848,359 A | * | 12/1998 | Furtaw ....................... 455/431 |
| 5,878,034 A | * | 3/1999 | Hershey et al. .......... 455/67.16 |
| 5,926,758 A | * | 7/1999 | Grybos et al. ............. 455/13.1 |
| 6,055,425 A | * | 4/2000 | Sinivaara .................... 455/431 |
| 6,061,562 A | * | 5/2000 | Martin et al. ............... 455/431 |
| 6,324,405 B1 | * | 11/2001 | Young et al. .............. 455/12.1 |
| 6,408,180 B1 | * | 6/2002 | McKenna et al. .......... 455/552 |

* cited by examiner

SIGNAL TRANSLATING REPEATER FOR ENABLING A TERRESTRIAL MOBILE SUBSCRIBER STATION TO BE OPERABLE IN A NON-TERRESTRIAL ENVIRONMENT

CROSS-REFERENCE TO RELATED APPLICATIONS

This application is a continuation-in-part of U.S. patent application Ser. No. 09/686,923 filed Oct. 11, 2000 and titled "Aircraft Based Network For Wireless Subscriber Stations", which is a continuation-In-part of U.S. patent application Ser. No. 09/379,825 filed Aug. 24, 1999 and titled "Ubiquitous Subscriber Station", now U.S. Pat. No. 6,408,356 which is a continuation-in-part of application Ser. No. 08/027,333, filed Mar. 8, 1992, now U.S. Pat. No. 5,444,762, titled "Method and Apparatus for Reducing Interference Among Cellular Telephone Signals" and application Ser. No. 07/847,920, filed Mar. 6, 1992, now U.S. Pat. No. 5,557,656, titled "Mobile Telecommunications".

FIELD OF THE INVENTION

This invention relates to cellular communications and, in particular, to a signal translating repeater that enables a terrestrial (ground-based) mobile subscriber station to provide wireless telecommunication services in both the terrestrial (ground-based) and non-terrestrial regions.

PROBLEM

It is a problem in the field of cellular mobile telecommunication services to provide customers with high quality communication services in a unified manner via a wireless communication medium. Existing cellular mobile telecommunication systems serve terrestrial (termed ground-based herein) mobile subscriber stations, but this service was traditionally not extensible to non-terrestrial mobile subscriber stations due to signal interference problems between ground-based and non-terrestrial mobile subscriber stations. The above-noted U.S. Patents disclose a non-terrestrial mobile telecommunication system and a mobile subscriber station operable in such a system, which provides subscribers with cellular mobile telecommunication services in the non-terrestrial region. However, the mobile subscriber stations used in the ground-based cellular mobile telecommunication system and the mobile subscriber stations used in the non-terrestrial cellular mobile telecommunication system are traditionally architect to operate in only their associated cellular mobile telecommunication system.

Thus, the existing mobile subscriber stations are incapable of being used both in ground-based cellular mobile telecommunication systems and non-terrestrial cellular mobile telecommunication systems. Therefore, subscribers must presently use one mobile subscriber station for the ground-based cellular mobile telecommunication system and another mobile subscriber station for the non-terrestrial cellular mobile telecommunication system. Each of these mobile subscriber stations has an assigned telephone number and the communication services provided to the subscriber are therefore disjunct.

The mobile subscriber station described in the above-noted U.S. patent application Ser. No.: 09/379,825, titled Ubiquitous Subscriber Station, provides wireless telecommunication services in both the terrestrial (ground-based) and non-terrestrial regions. This unique mobile subscriber station enables the subscriber to receive wireless cellular mobile telecommunication services in a unified manner in both the terrestrial (ground-based) and non-terrestrial regions.

However, for subscribers equipped with a traditional ground-based mobile subscriber station, there is no provision for receiving cellular communication services in an aircraft.

SOLUTION

The above described problems are solved and a technical advance achieved in the field by the signal translating repeater, located in an aircraft, that enables a traditional ground-based mobile subscriber station to provide wireless telecommunication services in both the terrestrial (ground-based) and non-terrestrial regions. The signal translating repeater extends the usage of existing cellular mobile telecommunication frequencies allocated for ground-based cellular communications to non-terrestrial cellular communications in a manner that avoids the possibility of signal interference between the ground-based and non-terrestrial mobile subscriber stations. In particular, the signal translating repeater automatically transitions between the communications paradigm used by the ground-based mobile subscriber station and the communications paradigm used in non-terrestrial cellular communications. The subscriber therefore can use their ground-based mobile subscriber station in all locations for uninterrupted wireless communications services, either using one telephone number for all locations, or by having a telephone number that is assigned for ground-based wireless communications services and another telephone number that is assigned for non-terrestrial wireless communications services.

The existing ground-based cell site transmitter/receiver antenna installations can be used to serve non-terrestrial mobile subscriber stations by the addition of non-terrestrial antenna elements. These non-terrestrial antenna elements create an antenna pattern which is insensitive to the reception of ground-originating or ground reflected signals and which antenna pattern is transmissive only in a skyward direction. In addition, there exist a number of signal characteristics that can be used to implement a non-interfering signal space. For example, the polarization of the signals produced by the non-terrestrial antenna elements can be a polarization that is different than and preferably substantially orthogonal to the polarization of the ground-based cellular radio signals, such as a horizontal polarization, to thereby minimize the possibility of interference with the vertically polarized ground-based cellular radio signals. Furthermore, the control signals exchanged between the non-terrestrial mobile subscriber stations and the non-terrestrial cell site controller are architected to avoid the possibility of interference with ground-based cell site transmitter-receiver pairs. In particular, the control channels used for the non-terrestrial mobile subscriber stations are selected such that the control signals transmitted in these channels are unrecognizable to the ground-based mobile subscriber stations and ground-based cell site transmitter-receiver pairs so that even if broadcasts from a non-terrestrial mobile subscriber station reach a ground-based mobile subscriber station or cell site transmitter-receiver pair they cannot be interpreted and are rejected out of hand. Optionally, the non-terrestrial system can switch uplink and downlink frequencies to be the opposite of ground-based mobile subscriber station pattern. In this manner, non-terrestrial cells can be created in the region of space adjacent to and overlying the existing ground-based cells and the existing cellular communication frequencies allocated for ground-based cellular telecommunications can be reused for non-terrestrial cellular telecommunications without the possibility of interaction between the existing ground-based cellular mobile telecommunication system and the non-terrestrial mobile subscriber stations. To the mobile telecommunication switching office, the non-terrestrial cells all operate in harmony with the existing ground-based cell sites with no discernible differentiation among cells or stations, whether ground-based or non-terrestrial in nature.

The present signal translating repeater is located in an aircraft and provides service to mobile subscriber stations that are located in the aircraft, using the ground-based cellular communication paradigm. The present signal translating repeater converts these ground-based cellular communication signals into signals pursuant to the non-terrestrial cellular telecommunication format and transmits these signals to the non-terrestrial cell site(s) presently serving the aircraft. In this manner, the subscribers in the aircraft can use their existing ground-based mobile subscriber stations in a manner that is consistent with use in communicating with the ground-based cell sites, while the aircraft communicates with the non-terrestrial cell site(s) presently serving the aircraft in a manner that is consistent with non-terrestrial mobile subscriber stations.

In this manner, the signal translating repeater automatically transitions between the communications paradigm used in ground-based mobile subscriber stations and the communications paradigm used in non-terrestrial cellular communications.

DETAILED DESCRIPTION

Figure 1:
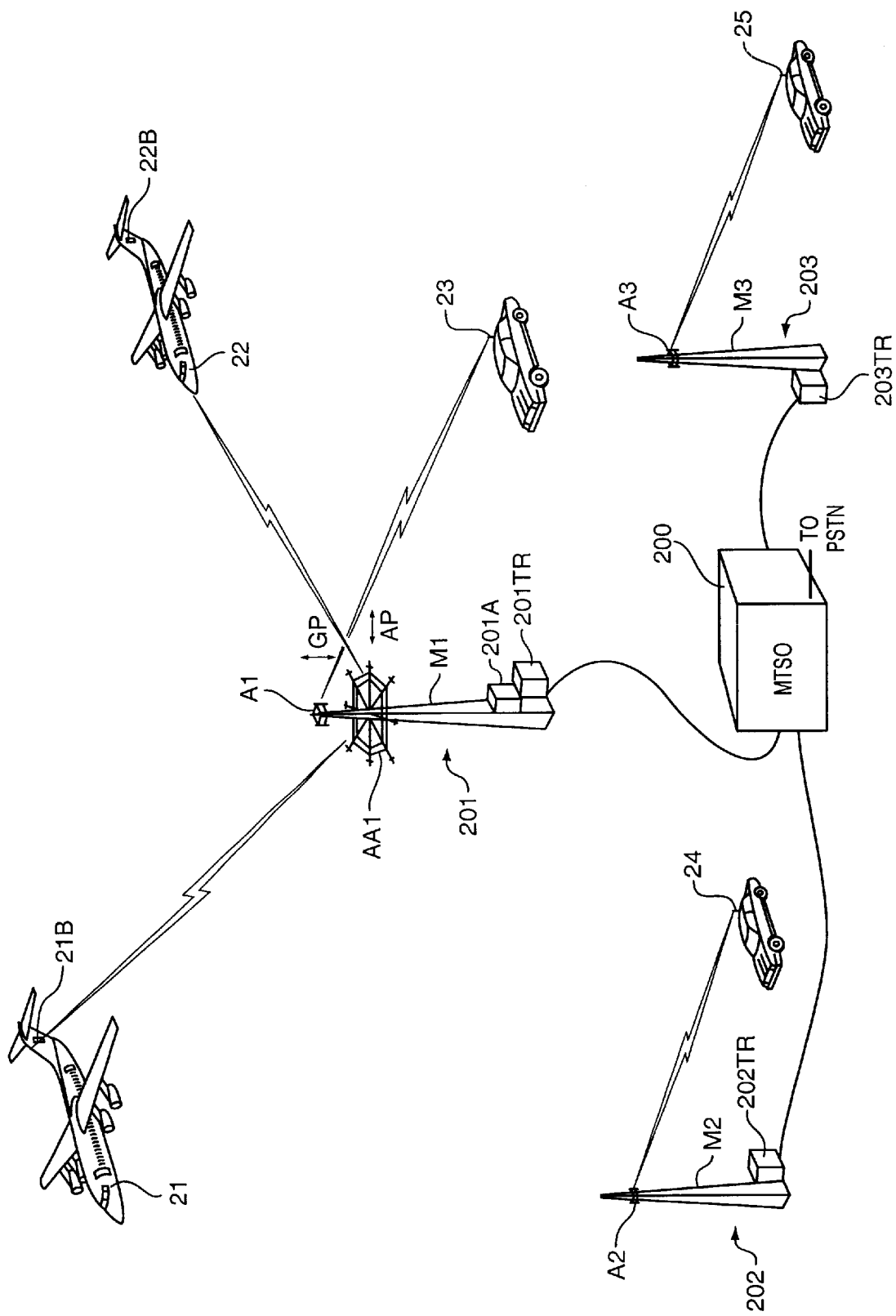
FIG. 1 illustrates, in block diagram form, the overall architecture of a multi-dimensional cellular mobile telecommunication network.

Cellular mobile telecommunication systems provide the service of connecting mobile telecommunication customers, each having a mobile subscriber station, to both land-based customers who are served by the common carrier public telephone network as well as other mobile telecommunication customers. In such a system, all incoming and outgoing calls are routed through mobile telecommunication switching offices (MTSO), each of which is connected to a plurality of cell sites (base stations) which communicate with mobile subscriber stations located in the area covered by the cell sites. The mobile subscriber stations are served by the cell sites, each of which is located in one cell area of a larger service region. Each cell site in the service region is connected by a group of communication links to the. mobile telecommunication switching office. Each cell site contains a group of radio transmitters and receivers with each transmitter-receiver pair being connected to one communication link. Each transmitter-receiver pair operates on a pair of radio frequencies: one frequency to transmit radio signals to the mobile subscriber station and the other frequency to receive radio signals from the mobile subscriber station.

The first stage of a cellular communication connection is set up when a transmitter-receiver pair in a cell site, operating on a predetermined pair of radio frequencies, is turned on and a mobile subscriber station, located in the cell site, is tuned to the same pair of radio frequencies. The second stage of the communication connection is between the communication link connected to this transmitter-receiver pair and the common carrier public telephone network. This second stage of the communication connection is set up in the mobile telecommunication switching office, which is connected to the common carrier public telephone network by incoming and outgoing trunks. The mobile telecommunication switching office contains a switching network to switch mobile customer voice and/or data signals from the communication link to an incoming or outgoing trunk. The mobile telecommunication system is controlled by a mobile telecommunication controller at the mobile telecommunication switching office and a cell site controller at each cell site associated with the mobile telecommunication switching office. A plurality of data links connect the mobile telecommunication controller and the associated cell site controllers. The mobile telecommunication controller operates under control of complex software and controls the switching network. The mobile telecommunication controller also controls the actions of the associated cell site controllers by generating and interpreting the control messages that are exchanged with the associated cell site controllers over the data links. The cell site controllers at each cell site, in response to control messages from the mobile telephone switching office, control the transmitter-receiver pairs at the cell site. The control processes at each cell site also control the tuning of the mobile subscriber stations to the selected radio frequencies.

Each cell in the ground-based cellular mobile telecommunication network comprises a predetermined volume of space radially arranged around the cell site transmitting antenna with the region of space roughly approximating a cylindrical volume having limited height. Since all of the mobile subscriber stations are installed in ground-based units (such as motor vehicles or handheld units) in traditional cellular mobile telecommunication systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. When a ground-based mobile subscriber station initiates a call connection, control signals from the local cell site transmitter cause the frequency agile transponder in the ground-based mobile subscriber station to operate at the frequency of operation designated for that particular cell site. As the ground-based mobile subscriber station moves from one cell site to another, the call connection is handed off to the successive cell sites and the frequency agile transponder in the ground-based mobile subscriber station adjusts its frequency of operation to correspond to the frequency of operation of the transmitter located in the cell site in which the ground-based mobile subscriber station is presently operational.

There are numerous technologies that can be used to implement the cellular mobile telecommunication system and these include both digital and analog paradigms, with the digital apparatus representing the more recent of the two technologies. Furthermore, the frequency spectrum is allocated for different cellular communication systems, with the personal communication system (PCS) systems being located in the 1.9 GHz region of the spectrum while traditional cellular systems are located in the 800 MHZ region of the spectrum. The access methods used in cellular communication systems include Code Division Multiple Access that uses orthogonal codes to implement communication channels, Time Division Multiple Access which uses time division multiplexing of a frequency to implement communication channels and Frequency Division Multiple Access which uses separate frequencies to implement communication channels, as well as combinations of these technologies. These concepts are well known in the field of cellular communications and various ones of these can be used to implement the ubiquitous mobile subscriber station of the present invention. These technologies are not limitations to the system which is described herein, since a novel system concept is disclosed, not a specific technologically limited implementation of an existing system concept.

This existing cellular mobile telecommunication system is presently in widespread use and has been designed to eliminate the problem of frequency overlap among adjacent cell sites and to minimize the number of frequencies required to serve vast areas without encountering the possibility of frequency overlap. These existing cellular mobile telecommunication systems, however, are inoperable when the user's mobile subscriber station is non-terrestrial in nature. In particular, the provision of cellular mobile telecommunication services to aircraft is inconsistent with the architecture of the existing ground-based cellular mobile telecommunication network since the antenna pattern of the existing ground-based cellular mobile telecommunication system broadcasts a signal in a pattern proximate to the ground and the pattern of frequency allocation for the pattern of cell sites is not extensible to aircraft. In particular, an antenna pattern that would be capable of serving a fast moving aircraft would have to cover a sufficient volume of space to minimize the number of station hand off as the aircraft traverses one cell site after another. For the non-terrestrial mobile subscriber station to have an adequate sized cell site, that cell site would span a large number of the existing ground-based cell sites. Therefore, the existing pattern of frequency reuse would be disrupted and there presently is no frequency allocated or available for allocation to such purpose. If additional frequencies were allocated for non-terrestrial cellular telecommunication systems, all existing cellular telecommunication equipment would have to be redesigned to be capable of operating at these new frequencies and yet remain compatible with the existing pattern of cellular telecommunication services. Existing cellular mobile telecommunication systems serve terrestrial (termed ground-based herein) mobile subscriber stations, but this service is not presently extensible to non-terrestrial mobile subscriber stations due to signal interference problems between ground-based and non-terrestrial mobile subscriber stations.

The multi-dimensional cellular mobile telecommunication system noted above extends the usage of existing cellular mobile telecommunication radio frequencies allocated for ground-based communications to non-terrestrial mobile subscriber stations in a manner that avoids the possibility of signal interference between the ground-based and non-terrestrial mobile subscriber stations. The multi-dimensional cellular mobile telecommunication system adds an overlay of non-terrestrial cells of predetermined geometry and locus in space to the existing ground-based cellular mobile telecommunication network. The polarization of the cellular radio signals produced by the non-terrestrial antenna elements is a polarization that is different than and preferably substantially orthogonal to the polarization of the cellular radio signals produced by the ground-based antennas, such as a horizontal polarization, to thereby minimize the possibility of interference with the nominally vertically polarized ground-based cellular radio signals. Furthermore, the control signals exchanged between the non-terrestrial mobile subscriber stations and the non-terrestrial cell site controller are architected to avoid the possibility of interference with ground-based cell site transmitter-receiver pairs. In particular, the control channels used for the non-terrestrial mobile subscriber stations are selected such that the control signals transmitted in these channels are unrecognizable to the ground-based mobile subscriber stations and cell site transmitter-receiver pairs, so that even if broadcasts from a non-terrestrial mobile subscriber station reach a ground-based mobile subscriber station or cell site receiver, they cannot be interpreted and are rejected out of hand.

Multi-Dimensional Cellular Mobile Telecommunication Network Architecture

FIG. 1 illustrates, in block diagram form, the overall architecture of a multi-dimensional cellular mobile telecommunication network. This diagram illustrates the basic concepts of the multi-dimensional cellular mobile telecommunication network and, for the purpose of simplicity of illustration, does not comprise all of the elements found in a typical network. The fundamental elements disclosed in FIG. 1 provide a teaching of the interrelationship of the various elements which are used to implement a multi-dimensional cellular mobile telecommunication network.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between subscriber stations and the transmitter-receiver pairs as well as the nature of the data transferred there between, be it voice, video, telemetry, computer data, and the like, are not limitations to the system which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between subscriber stations located in the cells and the associated transmitter-receiver pairs located at the cell site for each of these cells.

The cellular radio telecommunication service provided in North America, for example, is designed primarily for motor vehicles and other ground-based mobile subscriber stations. The system presently in use uses a plurality of radio frequency channels in the Ultra-High Frequency (UHF) band with each channel in this system comprising a pair of UHF frequencies in the designated band. One frequency in the channel is termed the "forward" carrier and is used for transmissions from the base station to the mobile subscriber station, while the other frequency in the pair is termed the "reverse" carrier and is used for transmissions from the mobile subscriber station to the base station. Present technologies in use include analog Frequency Modulation (FM) as the method for transmitting the signal with a 30 kHz frequency channel spacing. There is also digital transmission capability in some systems, wherein a plurality of signals are multiplexed on to the same carrier, with the 30 kHz spacing between adjacent bands (TDMA) or the code space is divided into multiple channels (CDMA). A total of 832 such channels are available for cellular telephone use, and these channels are located between the frequencies of 824 MHZ to 849 MHZ, and 869 MHZ to 894 MHZ. The transmitter has 832 communication channels, 790 voice/data communication and 42 control channels. This set of channels is divided into two subsets, each consisting of 21 control channels and an associated 395 voice/data channels. A first set of channels is typically termed the "A" side of the band and the remaining set of channels is typically termed the "B" side of the band. The 416 radio channels in each set of channels are divided into 21 control channels and 395 voice/data communication channels. The 395 voice/data communication channels can be subdivided into a predetermined number of groups, with a typical selection being seven groups of approximately 56 channels in a seven cell channel reuse plan, termed a K=7 plan.

The basic ground-based cellular telecommunication network of the prior art is incorporated into this system to enable the non-terrestrial mobile subscriber stations to be integrated into the existing service structure. In particular, the mobile telecommunication switching office 200 serves to interconnect a plurality of ground-based cells 201, 202, 203 with the public switched telephone network (PSTN), as noted above. The ground-based cells 201, 202, 203 each include a transmitter-receiver pair 201TR, 202TR, 203TR and an antenna complex, which typically comprises a tower M1, M2, M3 to which is affixed one or more antenna elements A1, A2, A3, respectively.

Existing cellular mobile telecommunication systems use both directional and non-directional antenna elements to implement the desired antenna characteristic pattern. Directional antenna, as the term is used herein, does not imply that a signal is transmitted or received from a particular direction, but that the antenna has a non-isotropic radiation pattern. A directional antenna, or a plurality of directional antenna elements, is preferably used on the ground-based cellular base station to increase signal separation. The antenna structure used in ground-based mobile cellular telecommunications is such that signals emanating from the cell site transmitter antenna elements of antennas A1, A2, A3, propagate in a substantially radial direction from the antenna in all directions with the top of the antenna pattern being substantially coplanar with the Earth's surface and at a level that corresponds to the elevation of the transmitter antenna above the Earth s surface. The receiver antenna has characteristics that are analogous to that of the transmitter antenna. The polarization of these signals is vertical in nature, shown by arrow GP in FIG. 1.

The multi-dimensional cellular mobile telecommunication network adds to the existing mobile cellular telecommunication network one or more non-terrestrial cells. A non-terrestrial cell is defined as an installation which is equipped with at least one non-terrestrial cell site transmitter-receiver pair, such as 201A and an associated antenna AA1 for receiving and transmitting cellular telecommunication transmissions to and from non-terrestrial mobile subscriber stations, such as aircraft 21, 22, which are equipped with mobile subscriber station apparatus 21B, 22B. The non-terrestrial transmitter-receiver pair 201A is interconnected to the public switched telephone network PSTN via the mobile telecommunication switching office MTSO. The non-terrestrial cell site antenna AA1 has a radio signal radiation pattern which is directed above a horizontal plane encompassing the antenna. The majority of the radiated radio signal is directed at angles above the horizontal plane, which angles are typically in the range of 1.5° to 4° in magnitude, to avoid interference with ground-based mobile cellular telephone stations 23, 24, 25. The multi-path effect is also minimized since the energy level of the signals impinging on the reflective earth surface is reduced.

The non-terrestrial cell site transmitter-receiver pair 201A can be integrated with an existing ground-based cell site transmitter-receiver pair, in that there is some sharing of equipment which mounts the antenna elements on a common tower M1 and/or interconnects both cell site transmitter-receiver pairs to the public switched telephone network PSTN. In the embodiment of FIG. 1, the non-terrestrial cell site antenna elements AA1 are mounted on the same tower M1 as the antenna elements A1 used to implement the ground-based cell site. The non-terrestrial cell site antenna elements AA1 are typically mounted below the existing antenna elements A1 used to implement (or reserved for) the ground-based cell site, which also reduces the ground footprint, thus reducing the Service Area Boundary as it exists for a ground-based mobile.

Figure 2:
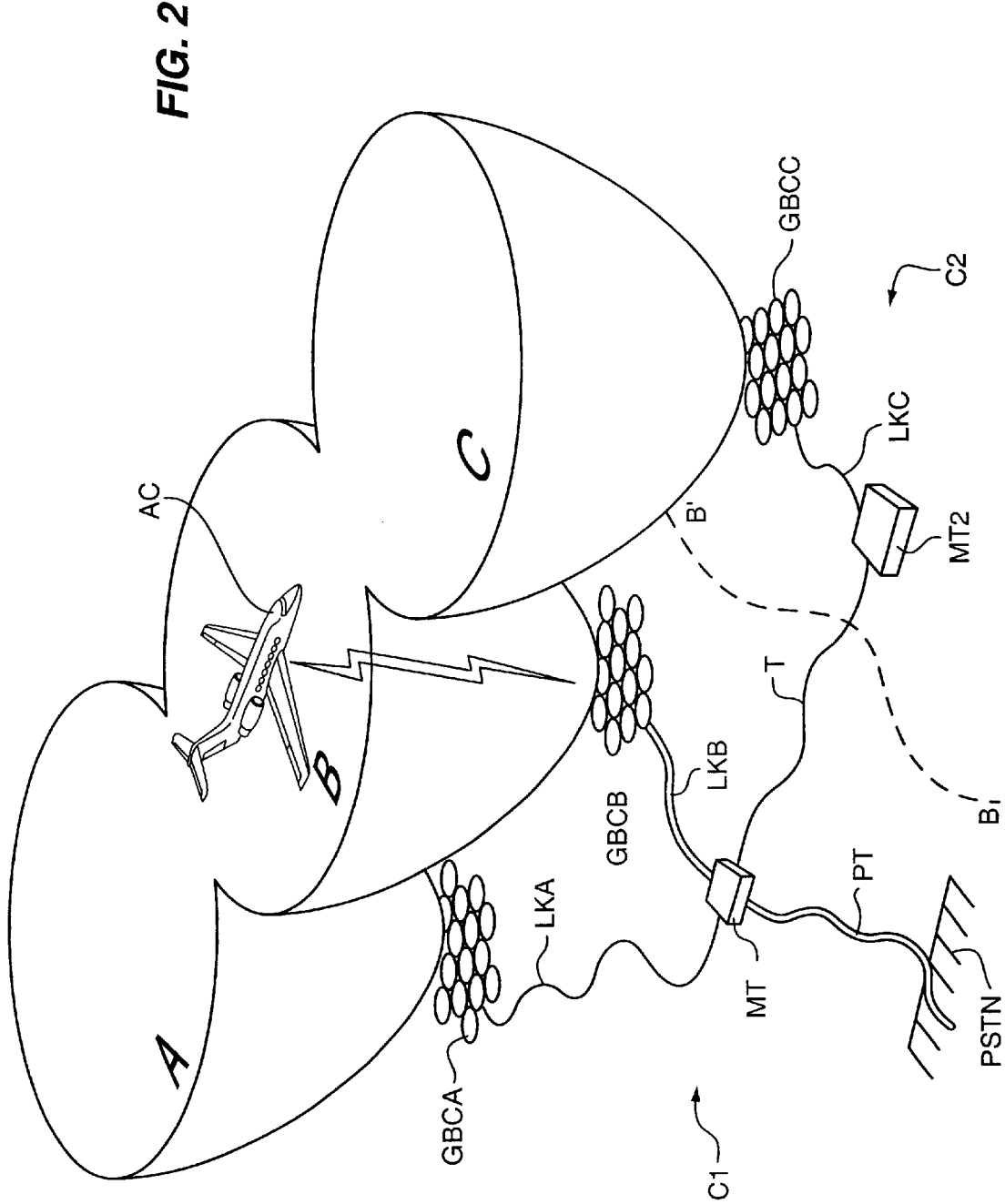
FIG. 2 illustrates, in block diagram form, additional details of the architecture of the non-terrestrial component of the multi-dimensional cellular telecommunication network.

FIG. 2 illustrates in block diagram view, additional details of the architecture of the non-terrestrial component of the multi-dimensional cellular telecommunication network where the non-terrestrial mobile subscriber station comprises an aircraft AC which is located in non-terrestrial cell B, which non-terrestrial cell overlays a plurality of ground-based cells GBCB. Two additional non-terrestrial cells A, C are also shown, each of which overlays another plurality of ground-based cells GBCA, GBCC, respectively. The three non-terrestrial cells A-C are shown as being oriented adjacent to each other, with cell B being located between non-terrestrial cells A and C. It is typical that other non-terrestrial cells would be implemented adjacent to non-terrestrial cells A-C to provide complete coverage of the non-terrestrial space that extends above the ground. For simplicity of description, only three non-terrestrial cells A-C are shown in FIG. 2. The existing ground-based cells are each connected via trunks LKA-LKC to an associated mobile telecommunication switching office MT1, MT2, which are themselves connected together via trunk T and to public switched telephone network PSTN via trunks PT. In this environment, it is typical that two different providers are serving the network, with a first company serving region C1 and a second company serving region C2, with the dividing line between the two service areas being shown in the figures by the dashed line B—B'. In this system environment, a call is established from a subscriber located in the aircraft AC, using a mobile subscriber station apparatus located in the aircraft AC in the well known manner of the existing ground-based cellular systems. The control signals from the mobile subscriber station apparatus located in the aircraft AC are transmitted to the cell site transmitter-receiver pair of non-terrestrial cell B, which is served by the first cellular company which provides service in region C1. The call is connected via trunk LKB to the mobile telecommunication switching office MT1, which interconnects the call connection to the public switched telephone network PSTN via trunk PT, in well known fashion. The call connection is then extended to the designated subscriber (not shown) which is assumed for this description to be located at a "land line" station. The allocation of frequencies and the subscriber identification for aircraft AC is managed via the non-terrestrial cell site control software which operates independent of the ground-based cellular network and which can be operational in the mobile telecommunication switching office MT1 which serves the non-terrestrial cell site for non-terrestrial cell B.

Multi-Dimensional Cellular System Control Channels

A particular problem is encountered when attempting to use cellular mobile telephone equipment from a non-terrestrial location, such as an aircraft. The elevated position of the mobile cellular telephone station when located aboard an aircraft causes the signal to be broadcast over a wide area of the surface of the earth, where it is received by many ground-based cell site transmitter-receiver pairs. In addition, the signal strength at a plurality of these ground-based cell site transmitter-receiver pairs may be substantially equal, making determination of the controlling base station a difficult choice. Thus, mobile cellular subscriber stations are typically prohibited by governmental regulatory agencies from transmitting from aircraft. The cellular telephone network requires a minimum signal-to-noise ratio to enable the communications to be of an acceptable quality. The presently required separation for analog AMPS service between signal power level and the background or noise power level can be as low as 6 dB (with 8–10 dB being typical) for the non-terrestrial subscriber station. In contrast, the ground-based mobile required separation is 17 dB for both the mobile subscriber station and the cell-site receiver for interference free communications. Thus, the non-terrestrial cellular communication portion of the multi-dimensional system must provide adequate signal strength by the appropriate selection and siting of antenna elements within the constraints of available signal power. In addition, the interference between ground-based and non-terrestrial mobile subscriber stations must be obviated by the signal characteristics as well as communication control philosophy.

Figure 4:
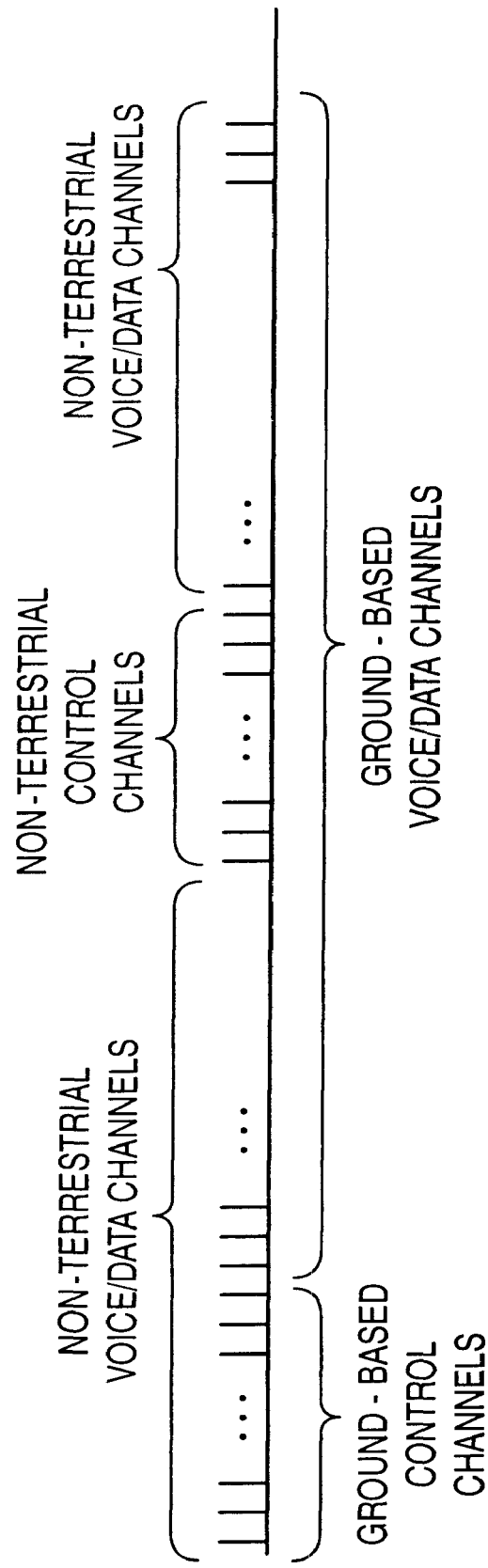
FIG. 4 illustrates the non-terrestrial cellular frequency allocation for a typical cell.

The communication control philosophy portion of this unique solution comprises a manipulation of the control channels such that control signals originated by a non-terrestrial mobile subscriber station cannot cause either a ground-based cell site receiver or ground-based mobile subscriber station receiver to receive and interpret these control signals. The designation of control channels within the plurality of available channels represents the method of bifurcating the volume of space into two disjunct regions: ground-based and non-terrestrial. As shown in FIG. 4, the control channels dedicated for use in non-terrestrial cellular communications are those which are designated as voice/data communication channels for the ground-based cellular communications. Thus, each ground-based cell site transceiver communicates with the ground-based mobile subscriber stations extant in its cell on predetermined control channels, which control channels are ignored by non-terrestrial mobile subscriber stations, since these channels are not control channels in the view of the non-terrestrial mobile subscriber stations. Similarly, each non-terrestrial cell site transmitter-receiver pair communicates with the non-terrestrial mobile subscriber stations extant in its cell on predetermined control channels, which control channels are ignored by ground-based mobile subscriber stations, since these channels are not control channels in the view of the ground-based mobile subscriber stations. Thus, the allocation of control channels in the non-terrestrial cells represents a paradigm shift with respect to the adjacent ground-based cells. This philosophy can be implemented in a cost effective manner, since the large installed base of ground-based mobile subscriber stations and ground-based cell site transmitter-receiver pairs inherently reject control signals transmitted outside of the control channels, such as in the voice/data communication channels. It is only the newly constructed non-terrestrial mobile subscriber stations and their associated cell site transmitter-receiver pairs which must be modified to reassign control channels. This implementation incurs a relatively small cost.

An alternative implementation of the communication control philosophy comprises allocating a subset of the available channels exclusively to non-terrestrial cellular communications, with this subset of dedicated channels being divided into control channels and communication channels as with the existing channel allocation pattern. However, the dedication of even a small number of channels can be problematic, since these channels are removed from all ground-based cells and can have significant impact on traffic handling capacity. In addition, such a solution requires the modification of all existing equipment.

Signal Translating Repeater Operation

The present signal translating repeater is located in an aircraft and provides service to ground-based mobile subscriber stations that are located in the aircraft, using the ground-based cellular communication paradigm. The present signal translating repeater converts between these ground-based cellular communication signals and non-terrestrial cellular communication signals. The non-terrestrial cellular communication signals are exchanged with non-terrestrial cell site(s) presently serving the aircraft. In this system, all ground-based mobile subscriber stations appear as roamers to the non-terrestrial base stations.

Figure 3:
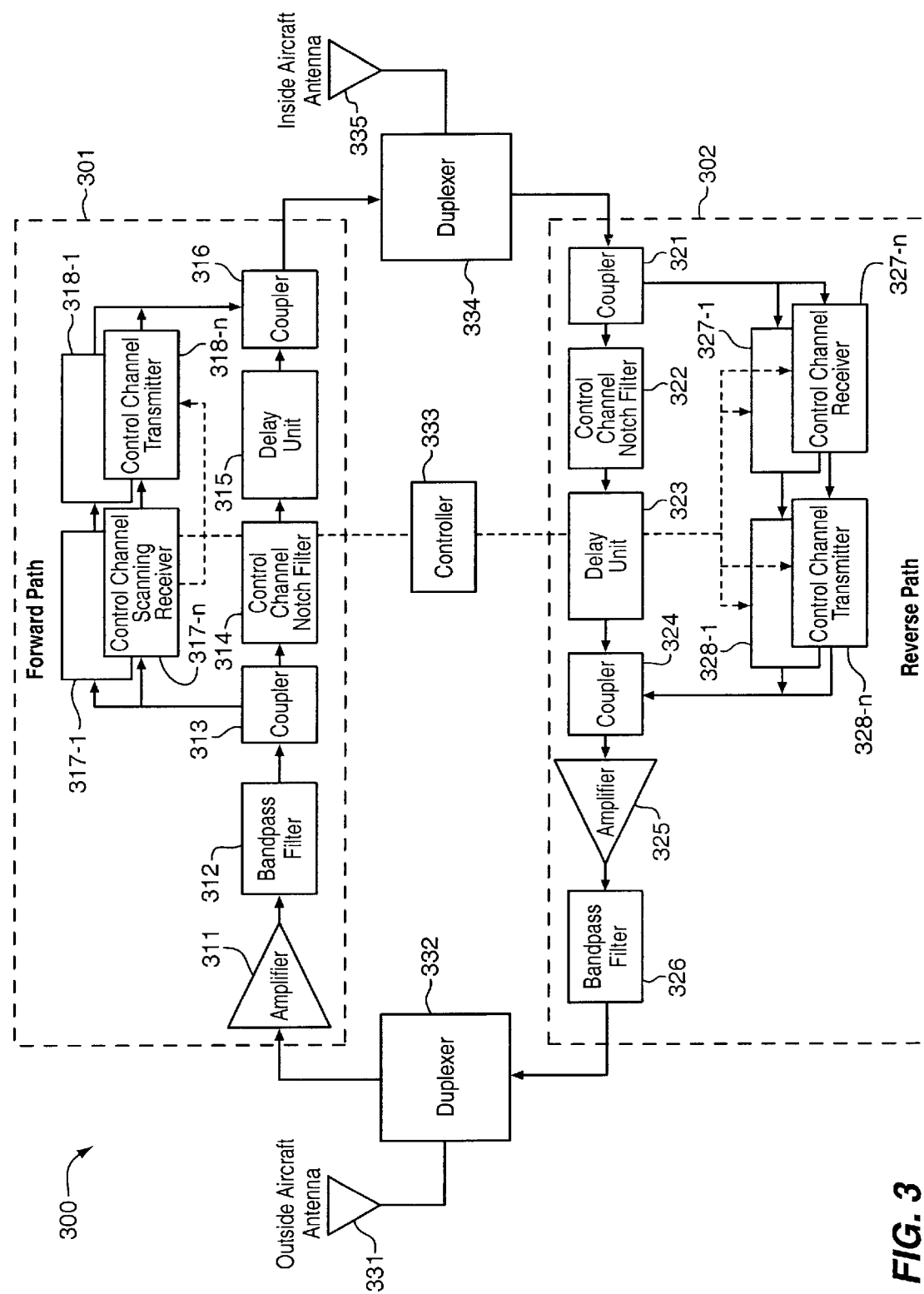
FIG. 3 illustrates, in block diagram form, the architecture of a typical embodiment of the signal translating repeater of the present invention.

As illustrated in FIG. 3, the present signal translating repeater 300 is a device that is a combination of a signal repeater and a frequency translator, termed "ReLator" herein. The non-terrestrial cell sites transmit control signals in non-terrestrial control channels (such as selected ones of channels 709–729) to the aircraft pursuant to the normal operation of the non-terrestrial cellular communication system. The ReLator, located on board the aircraft, captures these transmitted non-terrestrial forward path control signals via a standard non-terrestrial antenna located on the exterior of the aircraft and rebroadcasts these forward path control signals in the aircraft to the subscriber' ground-based mobile subscriber stations via an incabin antenna system on ground-based control channels, such as selected ones of channels 326–346. The rebroadcast signals comprise frequency translated signals using standard analog forward path control channels. The ReLator receives standard ground-based reverse path control signals on ground-based control channels, such as selected ones of channels 326–346, from the terrestrial mobile subscriber stations located on the aircraft and retransmits these reverse path control signals to the non-terrestrial cell site on non-terrestrial control channels, such as selected ones of channels 709–729. Voice channels are selected to be in the same place in the band for both the terrestrial and ground-based cellular, and are simply amplified and retransmitted without frequency translation. An alternative to frequency shifting the control channels is to regenerate the control channels on new, assigned standard frequencies. Another alternaive is to frequency translate the voice channels as well as the control channels to achieve separation of the two sets of signals.

In order to eliminate the possibility of inadvertently receiving signals that are transmitted from the ground on a ground-based control channel, the ReLator notches out the range of ground-based control channels (channels 313–354) from the received signals in the path that retransmits the voice channels, as described below. Thus, the ground-based mobile subscriber stations, located in the aircraft, only receive control signals on ground-based control channels which control signals comprise control signals that are frequency shifted from the received non-terrestrial control channels. In the reverse direction, the ReLator receives the control channel signals transmitted by the ground-based subscriber mobile stations located in the aircraft. The received control channel signals are decoded to ensure that they are valid control channel signals, not spurious signals. In addition, the proximity of the in-aircraft antenna 335 to the ground-based mobile subscriber stations that are located in the aircraft enables the present signal translating repeater to signal the ground-based mobile subscriber stations to reduce their operating power to a minimal level to thereby reduce the possibility of interference.

The present signal translating repeater can also function to preclude operation of any 800 MHz digital cellular mobile subscriber station in any of a number of modes. One such method is to delay the retransmission of the forward voice channel by a sufficient delay such that the round trip time from a non-terrestrial base station to the ground-based mobile subscriber station in the aircraft and back to the non-terrestrial base station exceeds the allowable delay time compensation in the ground-based mobile subscriber station. This time delay value is typically the equivalent to a round trip of >40 miles and consists of a time delay of approximately 500 microseconds or more. Thus, in this application, any CDMA, TDMA or GSM ground-based mobile subscriber station is unable to connect to an inadvertent ground cellular transmission, even if it were detectable in the aircraft.

Signal Translating Repeater Operation

A typical implementation of the present signal translating repeater 300 is illustrated in FIG. 3. This device consists of a non-terrestrial antenna 331, typically mounted on the outside of the aircraft, which is connected to a duplexer 332, which interconnects the non-terrestrial antenna 331 to a Forward Path Circuit 301 and a Reverse Path Circuit 302. Likewise, a cell-based antenna 335 is located inside the aircraft and is itself connected to the Forward Path Circuit 301 and the Reverse Path Circuit 302 via a duplexer 334.

The Forward Path Circuit 301 consists of a plurality of non-terrestrial control channel scanning receivers 317-1 to 317-n, each of which is connected to a corresponding ground-based control channel transmitter 318-1 to 318-n. These receivers and transmitters are connected to and controlled by the signal translating repeater controller 333. The non-terrestrial cell sites transmit control signals on non-terrestrial control channels (such as selected ones of channels 709–729) to the aircraft pursuant to the normal operation of the non-terrestrial cellular communication system. The non-terrestrial cellular signals in the forward direction are received by the non-terrestrial antenna 331, fed through the duplexer 332 and amplifier 311 to a band-pass filter 312. A coupler 313 then splits these amplified non-terrestrial cellular signals, with one portion being fed through a notch filter 314 to delete any signals that are carried in the ground-based control channels, which are channels 313–354. The resultant notch-filtered signals are fed through a delay element 315 to a coupler 316, where the control signals processed by the non-terrestrial control channel scanning receivers 317-1 to 317-n and the ground-based control channel transmitters 318–1 to 318-n are translated into the ground-based control channels, which are channels 313–354. The portion of the received amplified non-terrestrial cellular signals that are coupled by the coupler 313 to the non-terrestrial control channel scanning receivers 317-1 to 317-n and the ground-based control channel transmitters 318-1 to 318-n are processed by these elements to excerpt the control channel content and frequency translate the control channel signals to different associated control channels. Thus, the control signals carried by the non-terrestrial control channels (such as selected ones of channels 709–729) are translated into the ground-based control channels, which are channels 313–354. The non-terrestrial voice channels received from the non-terrestrial cell site are simply forwarded, without frequency translation, to the ground-based mobile subscriber stations. These voice signals are amplified by the amplifier 311. Alternatively, the voice channels can also be frequency translated to further reduce the possibility of signal interference.

The Reverse Path Circuit 302 consists of a plurality of ground-based control channel receivers 327-1 to 327-n, each of which is connected to a corresponding non-terrestrial control channel transmitter 328-1 to 328-n. These receivers and transmitters are connected to and controlled by the signal translating repeater controller 333. The ground-based mobile subscriber stations transmit control signals on ground-based control channels (such as selected ones of channels 313–354) in the aircraft pursuant to the normal operation of the ground-based cellular communication system. The ground-based cellular signals in the reverse direction are received by the cell-based antenna 335, fed through the coupler 321, which splits the ground-based cellular signals, with one portion being fed through a notch filter 322 to delete any signals that are carried in the ground-based control channels (such as selected ones of channels 313–354). The resultant notch-filtered signals are fed through a delay element 323 to a coupler 324, where the control signals processed by the ground-based control channel receivers 327-1 to 327-n and the non-terrestrial control channel transmitters 328-1 to 328-n are translated into the non-terrestrial control channels, such as selected ones of channels 709–729. The portion of the received amplified ground-based cellular signals that are coupled by the coupler 321 to the ground-based control channel receivers 327-1 to 327-n and the non-terrestrial control channel transmitters 328-1 to 328-n are processed by these elements to excerpt the control channel content and frequency translate the control channel signals to different associated control channels. Thus, the control signals carried by the ground-based control channels, which are channels 313–354, are translated into the non-terrestrial control channels (such as selected ones of channels 709–729). These control signals inserted into the non-terrestrial control channels and the ground-based voice channels received from the ground-based mobile subscriber stations are amplified by amplifier 325 and processed through band-pass filter 326 to duplexer 332 and non-terrestrial antenna 331 for transmission to the non-terrestrial cell site. The voice channel signals can be forwarded, without frequency translation, to the non-terrestrial cell sites or they can also be frequency translated as with the control channel signals.

SUMMARY

The present signal translating repeater is located in an aircraft and provides service to mobile subscriber stations that are located in the aircraft, using the ground-based cellular communication paradigm. The present signal translating repeater converts these ground-based cellular communication signals into signals pursuant to the non-terrestrial cellular telecommunication format and transmits these signals to the non-terrestrial cell site(s) presently serving the aircraft.

What is claimed:

1. Cellular radio communication apparatus, located in an aircraft, operable to provide communication services to ground-based cellular mobile subscriber stations that are located in said aircraft, via a non-terrestrial cellular mobile cellular communications, comprising:

first amplifier means, responsive to receipt of radio frequency communication signals from non-terrestrial cell sites and in a mode compatible with non-terrestrial cellular communications for amplifying said received non-terrestrial cellular signals;

second amplifier means, responsive to receipt of radio frequency communication signals from ground-based cellular mobile subscriber stations and in a mode compatible with ground-based cellular communications, for amplifying said received ground-based cellular signals;

control channel frequency translation means for exchanging control signals from control channels on said received ground-based cellular signals to control channels on non-terrestrial cellular control channels and from control channels on said received non-terrestrial cellular signals to control channels on ground-based cellular control channels;

first transmitter means for transmitting said amplified received non-terrestrial cellular signals and said control signals, exchanged from control channels on said received non-terrestrial cellular signals to control channels on ground-based cellular control channels, to said ground-based cellular mobile subscriber stations that are located in said aircraft; and second transmitter means for transmitting said amplified received ground-based cellular signals and said control signals, exchanged from control channels on said received ground-based cellular signals to control channels on non-terrestrial cellular control channels, to said non-terrestrial cell sites.

2. The cellular radio communication apparatus of claim 1 further comprising:

notch filter means, responsive to said amplified received non-terrestrial cellular signals, for deleting signals contained in channels of said amplified received non-terrestrial cellular signals that correspond to ground-based cellular control channels.

3. The cellular radio communication apparatus of claim 2 further comprising:

coupler means, responsive to receipt of said amplified received non-terrestrial cellular signals, having signals deleted there from that correspond to ground-based cellular control channels, for inserting said control signals, exchanged from control channels on said received non-terrestrial cellular signals into control channels on ground-based cellular control channels.

4. The cellular radio communication apparatus of claim 3 further comprising:

means for polarizing said amplified received non-terrestrial cellular signals, with said control signals, exchanged from control channels on said received non-terrestrial cellular signals inserted into control channels on ground-based cellular control channels, in a polarization that is substantially identical to a polarization of ground-based cellular radio frequency communication signals.

5. The cellular radio communication apparatus of claim 1 further comprising:

radio frequency receiver means for demodulating said radio frequency communication signals received from said non-terrestrial cell sites.

6. The cellular radio communication apparatus of claim 1 further comprising:

notch filter means, responsive to said amplified received ground-based cellular signals, for deleting signals contained in channels of said amplified received ground-based cellular signals that correspond to ground-based cellular control channels.

7. The cellular radio communication apparatus of claim 6 further comprising:

coupler means, responsive to receipt of said amplified received ground-based cellular signals having signals deleted there from that correspond to ground-based cellular control channels, for inserting said control signals, exchanged from control channels on said received ground-based cellular signals to control channels on non-terrestrial cellular control channels.

8. The cellular radio communication apparatus of claim 7 further comprising:

means for polarizing said amplified received ground-based cellular signals, with said control signals, exchanged from control channels on said received ground-based cellular signals inserted into control channels on non-terrestrial cellular control channels, in a polarization that is substantially identical to a polarization of non-terrestrial cellular radio frequency communication signals.

9. The cellular radio communication apparatus of claim 1 further comprising:

radio frequency receiver means for demodulating said radio frequency communication signals received from said ground-based cellular mobile subscriber stations.

10. The cellular radio communication apparatus of claim 1 further comprising:

means for disabling operation of digital cellular mobile subscriber stations that are located in said aircraft.

11. The cellular radio communication apparatus of claim 1 further comprising:

power management means for regulating operation of said ground-based cellular mobile subscriber stations to a minimal power level to avoid interference.

12. A method of providing communication services to ground-based cellular mobile subscriber stations that are located in an aircraft, via a non-terrestrial cellular mobile cellular communications, comprising:

amplifying, in response to receipt of radio frequency communication signals from non-terrestrial cell sites and in a mode compatible with non-terrestrial cellular communications, said received non-terrestrial cellular signals;

amplifying, in response to receipt of radio frequency communication signals from ground-based cellular mobile subscriber stations and in a mode compatible with ground-based cellular communications, said received ground-based cellular signals;

exchanging control signals from control channels on said received ground-based cellular signals to control channels on non-terrestrial cellular control channels and from control channels on said received non-terrestrial cellular signals to control channels on ground-based cellular control channels;

transmitting said amplified received non-terrestrial cellular signals and said control signals, exchanged from control channels on said received non-terrestrial cellular signals to control channels on ground-based cellular control channels, to said ground-based cellular mobile subscriber stations that are located in said aircraft; and transmitting said amplified received ground-based cellular signals and said control signals, exchanged from control channels on said received ground-based cellular signals to control channels on non-terrestrial cellular control channels, to said non-terrestrial cell sites.

13. The method of providing communication services to ground-based cellular mobile subscriber stations that are located in an aircraft of claim 12 further comprising:

deleting, in response to said amplified received non-terrestrial cellular signals, signals contained in channels of said amplified received non-terrestrial cellular signals that correspond to ground-based cellular control channels.

14. The method of providing communication services to ground-based cellular mobile subscriber stations that are located in an aircraft of claim 13 further comprising:

inserting, in response to receipt of said amplified received non-terrestrial cellular signals, having signals deleted there from that correspond to ground-based cellular control channels, said control signals, exchanged from control channels on said received non-terrestrial cellular signals into control channels on ground-based cellular control channels.

15. The method of providing communication services to ground-based cellular mobile subscriber stations that are located in an aircraft of claim 14 further comprising:

polarizing said amplified received non-terrestrial cellular signals, with said control signals, exchanged from control channels on said received non-terrestrial cellular signals inserted into control channels on ground-based cellular control channels, in a polarization that is substantially identical to a polarization of ground-based cellular radio frequency communication signals.

16. The method of providing communication services to ground-based cellular mobile subscriber stations that are located in an aircraft of claim 12 further comprising:

demodulating said radio frequency communication signals received from said non-terrestrial cell sites.

17. The method of providing communication services to ground-based cellular mobile subscriber stations that are located in an aircraft of claim 12 further comprising:

deleting, in response to said amplified received ground-based cellular signals, signals contained in channels of said amplified received ground-based cellular signals that correspond to ground-based cellular control channels.

18. The method of providing communication services to ground-based cellular mobile subscriber stations that are located in an aircraft of claim 17 further comprising:

inserting, in response to receipt of said amplified received ground-based cellular signals having signals deleted there from that correspond to ground-based cellular control channels, said control signals, exchanged from control channels on said received ground-based cellular signals to control channels on non-terrestrial cellular control channels.

19. The method of providing communication services to ground-based cellular mobile subscriber stations that are located in an aircraft of claim 18 further comprising:

polarizing said amplified received ground-based cellular signals, with said control signals, exchanged from control channels on said received ground-based cellular signals inserted into control channels on non-terrestrial cellular control channels, in a polarization that is substantially identical to a polarization of non-terrestrial cellular radio frequency communication signals.

20. The method of providing communication services to ground-based cellular mobile subscriber stations that are located in an aircraft of claim 12 further comprising:

demodulating said radio frequency communication signals received from said ground-based cellular mobile subscriber stations.

21. The method of providing communication services to ground-based cellular mobile subscriber stations that are located in an aircraft of claim 12 further comprising:

disabling operation of digital cellular mobile subscriber stations that are located in said aircraft.

22. The method of providing communication services to ground-based cellular mobile subscriber stations that are located in an aircraft of claim 12 further comprising:

regulating operation of said ground-based cellular mobile subscriber stations to a minimal power level to avoid interference.

* * * * *